United States Patent [19]

Wooldridge et al.

[11] Patent Number: 4,576,618

[45] Date of Patent: Mar. 18, 1986

[54] SELF-CLEANING COLLECTING DEVICE

[75] Inventors: James E. Wooldridge; Robert E. Osborne; Robert W. Sexton, all of Louisville, Ky.

[73] Assignee: Allis-Chalmers Corporation, Milwaukee, Wis.

[21] Appl. No.: 639,534

[22] Filed: Aug. 9, 1984

Related U.S. Application Data

[63] Continuation-in-part of Ser. No. 408,611, Aug. 16, 1982, abandoned.

[51] Int. Cl.⁴ ............................................. B03C 3/01
[52] U.S. Cl. .................................... 55/122; 55/240; 55/138; 55/259; 55/481
[58] Field of Search ............... 55/122, 126, 138, 233, 55/240, 259, 481

[56] References Cited

U.S. PATENT DOCUMENTS

| | | | |
|---|---|---|---|
| 2,024,226 | 12/1935 | Irwin et al. | 55/122 |
| 2,180,586 | 11/1939 | Gustafsson | 55/229 |
| 2,184,731 | 12/1939 | Brewer | 55/225 |
| 2,197,004 | 4/1940 | Myers | 55/259 |
| 2,889,005 | 6/1959 | Umbricht | 55/229 |
| 2,966,958 | 1/1961 | Sexton | 55/224 |
| 3,016,980 | 1/1962 | Gonzalez | 55/137 |
| 3,022,859 | 2/1962 | Sexton | 55/259 |
| 3,134,825 | 5/1964 | Sexton | 55/259 |
| 3,315,445 | 4/1967 | De Seversky | 55/122 |
| 3,336,733 | 8/1967 | Wisting | 55/228 |
| 3,397,513 | 8/1968 | Ephraim et al. | 55/225 |
| 3,593,497 | 7/1971 | Grimm et al. | 55/250 |
| 3,650,092 | 3/1972 | Gourdine et al. | 55/137 |
| 3,760,566 | 9/1973 | Zievers et al. | 55/259 |
| 3,802,158 | 4/1974 | Ohle | 55/122 |
| 3,907,525 | 9/1975 | King | 55/126 |
| 4,259,093 | 3/1981 | Vlastos et al. | 55/137 |

Primary Examiner—Bernard Nozick
Attorney, Agent, or Firm—Donald C. McGaughey

[57] ABSTRACT

A self-cleaning collecting device for cleaning a dirty gas stream including a flow-through housing having a dirty gas inlet at the base of the housing and a clean gas outlet at the top of the housing interconnected by a gas treating passage adapted to direct a gas stream vertically through the housing. As the dirty gas stream enters the housing, it is circulated through a liquid bath where noxious vapors and larger particulates are entrained in a mist of liquid droplets which are in turn captured and removed from the gas stream as it moves through a separating panel positioned above the liquid bath. As the gas flows upwardly out of the panel, the captured liquid is circulated to the liquid bath to maintain a flow of liquid within the panel which acts to continuously wash the particulates from the panel. At the same time, the gas stream continues upwardly in the treating passage where it flows through an electrostatic precipitator which removes the smaller particulates from the gases prior to their being discharged from the housing through the gas outlet at the top of the housing.

8 Claims, 5 Drawing Figures

SELF-CLEANING COLLECTING DEVICE

This application is a continuation-in-part of application Ser. No. 408,611, filed Aug. 16, 1982, now abandoned.

BACKGROUND OF THE INVENTION

1. Field of the Invention

The present invention relates to a selfcleaning collecting device for removing vapors and solid particulates from a gas stream.

2. Description of the Prior Art

The prior art includes a variety of collecting arrangements for removing noxious vapors and solid particulates from a dirty gas stream generated by the various metal working and chemical processes used in automotive plants, foundries, and the like.

U.S. Pat. No. 2,966,958 discloses a typical collecting device wherein noxious vapors and larger particulates are removed from a dirty gas stream by passing the gas stream through a porous media flooded with a liquid which coalesces with the vapors and entrains the particulates so they can be removed by separating the liquid from the gas stream. While this type of arrangement has been satisfactory in many applications, experience has indicated it usually is most effective where the clean air is discharged into the atmosphere away from the work area as it is primarily intended to remove larger particulates having a diameter in excess of 1 micron. Thus, this type of arrangement would generally be inappropriate where it is desired to recycle the air within a plant to save heating or cooling of the air where a substantial portion of the particulates smaller than 1 micron would still be entrained in the air.

The electrostatic precipitator shown in U.S. Pat. No. 3,016,980 represents one method of cleaning the air in a factory prior to recycling it within the plant. In that arrangement, the dirty gases are circulated through one or more collecting cells having a plurality of spaced parallel collecting plates which are charged to attract oppositely charged particles in the dirty gases as they flow through the cell between the collecting plates. In the typical plant application, a plurality of cells are secured to a grid-like frame to form a bank of side-by-side cells sized according to the air cleaning requirements of the installation. While this approach has proven to be extremely effective in many applications, when it is used to remove the particulates and oil vapors generated during flame cutting and various die casting operations, the rapid agglomeration of the particulates resulting from those processes on the collecting plates tends to clog up the cells, and localized accumulations of liquid on the plates often lead to excessive arcing within the individual cells. Consequently, where this type of arrangement has been used to clean the gases resulting from those processes, it has generally been necessary to construct a very large installation to maintain the air flow through each of the cells at a level low enough to prevent these problems.

SUMMARY OF THE INVENTION

The present invention relates to a self-cleaning collecting device for cleaning a dirty gas stream.

The collecting device includes a flow-through housing having a dirty gas inlet at the base of the housing and a clean gas outlet at the top of the housing interconnected by a gas treating passage adapted to direct the gas stream vertically through the housing. The lower portion of the treating passage encloses a liquid bath treating section wherein an apertured plate is secured across the passage above a liquid reservoir connected with a pneumatic lift adapted to disperse a predetermined flow of liquid onto the upper surface of the plate which is entrained in the gas stream as the liquid flows into the apertures in the plate. This results in the noxious vapors and the larger particulates in the gas stream being entrained in a mist of liquid droplets formed in the gas stream as it passes through the plate. Then, as the gas stream moves upwardly in the treating passage from the apertured plate, it flows through a filter panel formed of a fiberous material secured across the passage above the plate. The filter panel separates the liquid droplets from the gas stream whereafter the liquid accumulating in the panel from the droplets is circulated back to the reservoir to maintain a flow of liquid within the panel which acts to continuously wash the particulates from the panel. The self-cleaning action provides a better operating condition and a smaller collecting device and less downtime for servicing. Thereafter, as the gas stream continues upwardly in the treating passage, it flows through an electrostatic precipitator which removes the smaller particulates from the gas stream which is ultimately discharged from the housing through the clean gas outlet. The clean gas emerging from the clean gas outlet is adequately cleaned for recirculation through the circulating gas system.

From the foregoing, it can be seen that the self-cleaning collection device embodying the invention is of a relatively straightforward, durable design which is easy to monitor and maintain in the field. However, it is to be understood that various changes can be made in the arrangement, form and construction of the apparatus disclosed herein without departing from the spirit and scope of the invention.

DESCRIPTION OF THE PREFERRED EMBODIMENT

Figure 1:
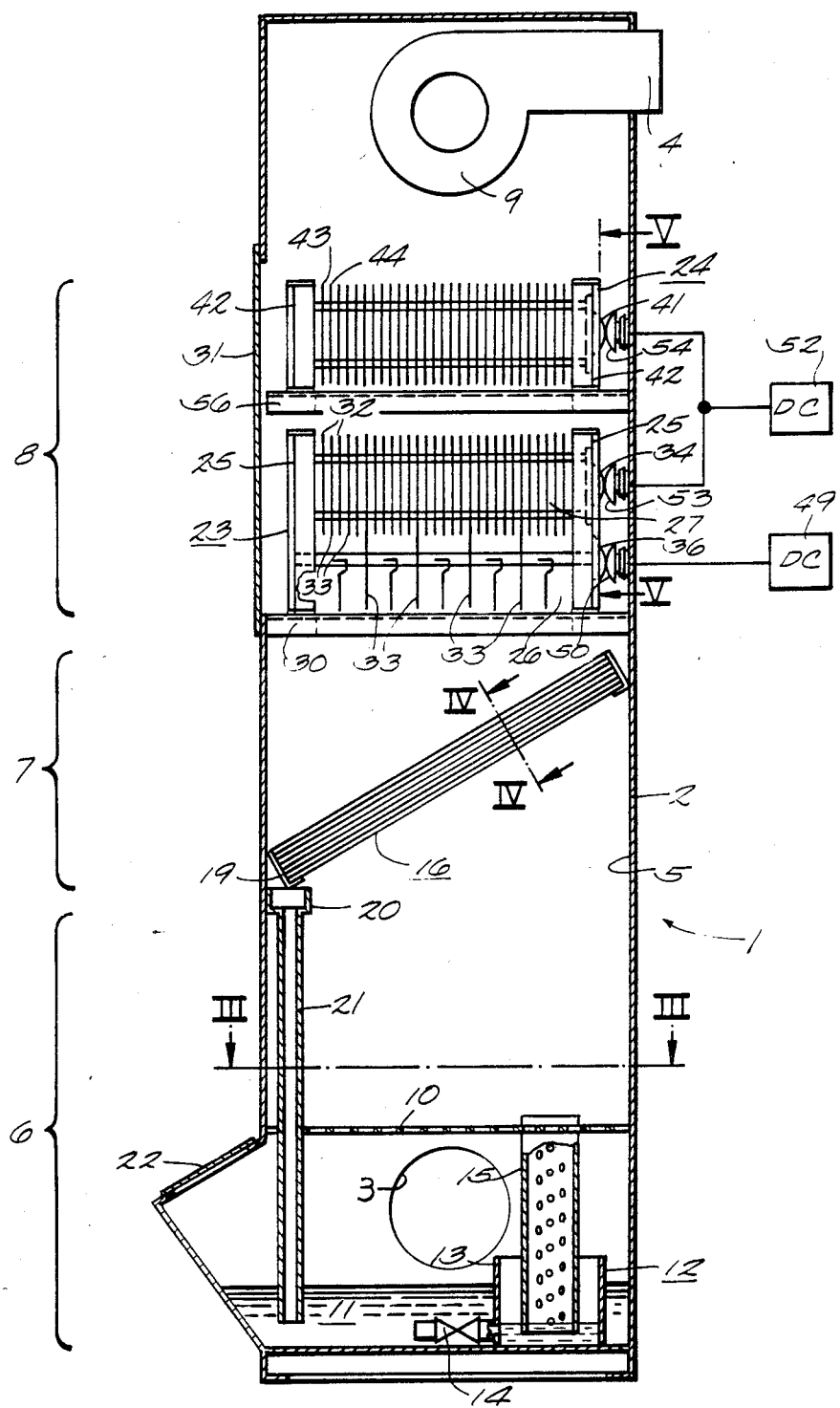
FIG. 1 is a side elevational view, partially in section, showing the collecting device embodying the invention.
Figure 2:
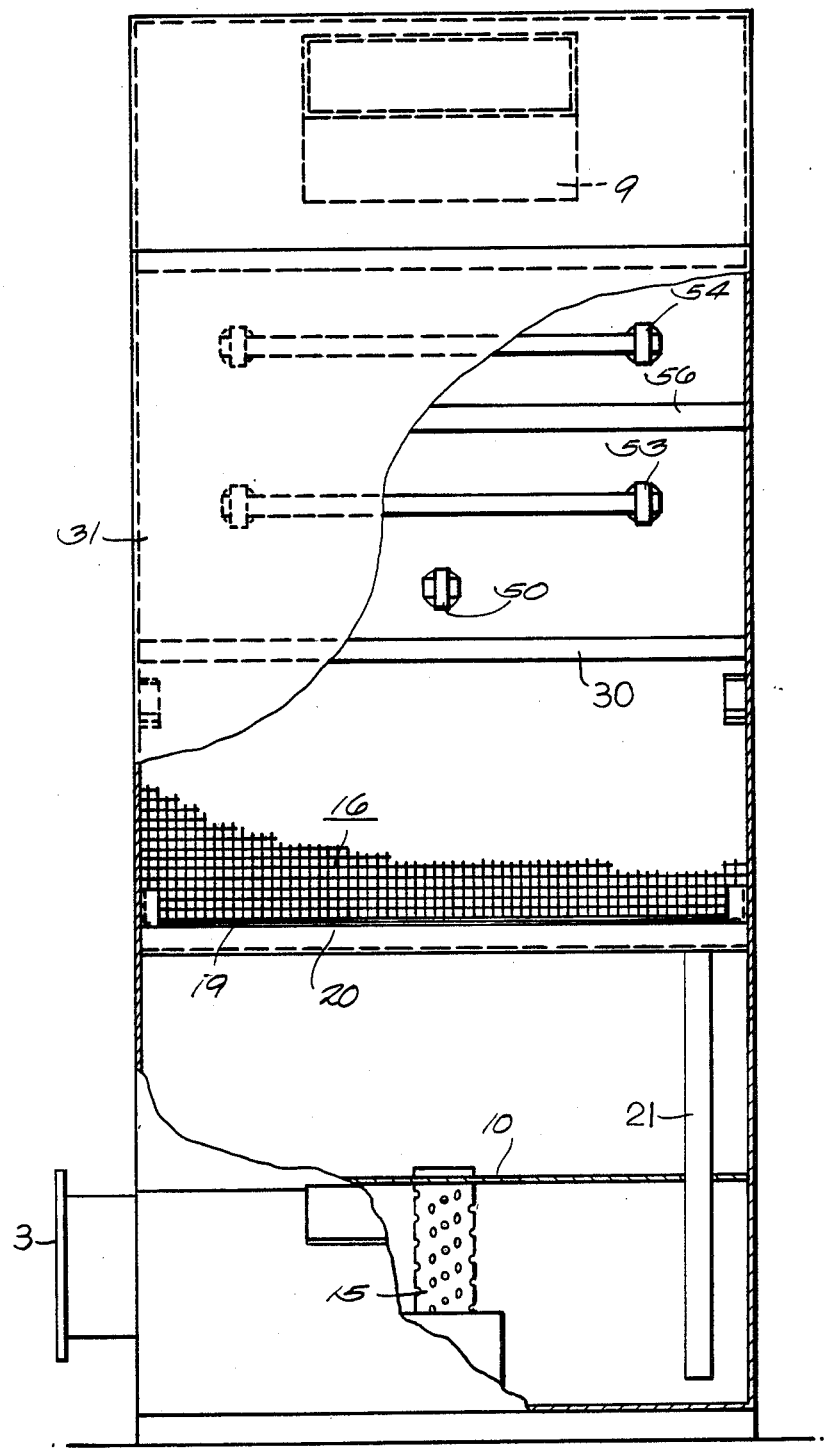
FIG. 2 is an end elevational view, partially in section, of the collecting device shown in FIG. 1.
Figure 3:
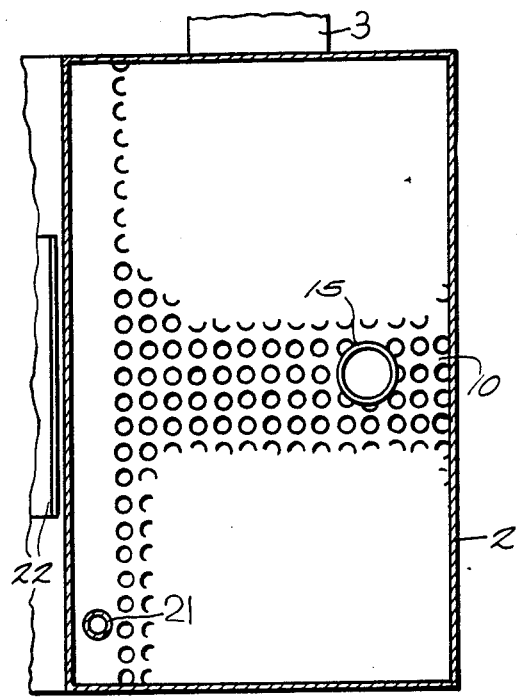
FIG. 3 is a cross-sectional view taken substantially along line III—III in FIG. 1.

As shown in FIGS. 1-3, the self-cleaning collecting device 1 embodying the invention includes a vertical housing 2 having a dirty gas inlet duct 3 at its lower end and a clean gas outlet duct 4 at its upper end interconnected by a gas treating duct 5 extending vertically through the housing 2. As will be described, the treating duct 5 is divided into a liquid bath treating section 6, a separating section 7, and an electrostatic precipitating section 8 which are arranged in series within the treating duct 5 to clean the dirty gas stream as it is drawn into the housing 2 through the inlet duct 3 and circulated upwardly through the treating duct 5 by a blower or fan 9 mounted in the top of the housing which in turn directs the gas stream out of the housing through the outlet duct 4 to a ventilating duct 70 and the ventilated room 71 of a plant and to return conduit 72.

As shown in the drawings, an apertured plate 10 is secured across the gas treating duct 5 in the liquid bath treating section 6. The apertured plate 10 is positioned above a liquid reservoir 11 formed in the bottom of the housing 2 from which liquid is aspirated onto the upper surface of the apertured plate 10 where it is entrained in the gas stream as the liquid flows into the apertures in the plate 10 during gas cleaning operations. The liquid, which may be a paraffin base mineral oil having a mean viscosity of about 1500 SSU (Seconds Saybolt Universal), is aspirated onto the apertured plate 10 by a pneumatic lift assembly 12 operating as a pump means including a cup 13 secured in the reservoir 11 to provide a liquid sump having a conventional fluid metering valve 14 secured to the cup 13 adapted to meter a predetermined flow of liquid from the reservoir 11 into the cup 13, and a tube 15 extending from the cup 13 through the apertured plate 10. The aspirating action of the lift assembly 12 is effected by the pressure differential created in the gas stream as it flows through the apertures in the plate 10 since the lower pressure above the plate 10 serves to draw the liquid into the cup 13 through the valve 14 and then aspirate it upwardly through the tube 15 whereafter it falls onto the upper surface of the plate. In the embodiment shown, a plurality of apertures in the range of $\frac{3}{4}$–2 inches in diameter are provided in the plate 10 so that about 6–10 percent of the plate is open area, although this arrangement will still function effectively where as much as 25 percent of the plate is open area. This results in a pressure differential of about $\frac{3}{4}$–$1\frac{1}{2}$ inches water gauge when the gas stream is flowing through the housing at a velocity in the range of 200–500 feet per minute. Experience has indicated this pressure differential is sufficient to aspirate the liquid upwardly through the tube 15 so it is distributed relatively uniformly on the upper surface of the plate 10 where it migrates to the apertures where it is entrained in the gas stream flowing through the apertures to effect coalescence of the noxious vapors and entrainment of the larger particulates in a mist of liquid droplets formed in the gas stream as it flows through the plate 10 and into the separating section 7.

Figure 4:
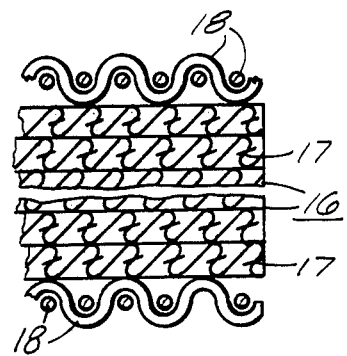
FIG. 4 is a partial cross-sectional view taken substantially along line IV—IV in FIG. 1.

The separating flat or planar section 7 includes a separating panel 16 secured in flow-through relation across the treating duct 5 at an acute angle of 30–45 degrees to the horizontal. As shown in FIG. 4, panel 16 is formed by sandwiching a plurality of parallel, contiguous layers or strands of crimped wire material 17 forming a maze of tortuous passages within the panel between comparatively rigid expanded screening 18. Thus, as the gas stream flows upwardly through the panel 16, it must pass through a maze of tortuous passages which effect impingement and inertial separation of the liquid droplets carrying the noxious vapors and the larger particulates from the gas stream as it flows upwardly out of the panel 16. Then, due to the angular alignment of the separating panel 16 in the treating duct 5, the liquid flows or migrates to the lower edge 19 of the panel where it flows into a trough 20 secured across the treating duct 5 beneath the lower edge 19 which in turn channels the liquid into a vertical conduit 21 which circulates it back into the reservoir 11. This arrangement effectively removes the liquid mist from the gas stream while at the same time utilizing the liquid flow within the panel to clean it during operation of the device. In this regard, it should be noted as the liquid is circulated back to the reservoir, the particulates in the liquid tend to settle to the bottom of the reservoir enabling them to be periodically removed as a sludge through an access or cleaning door 22 provided in the bottom of the housing. The panel 16 may be replaced through access door 31.

Referring to FIG. 1, a pair of electrostatic collecting units 23 and 24 are secured in serially aligned flow-through relation in the precipitating section 8. The electrostatic precipitator precipitates particulate of submicron size and fumes to further condition the gas for recirculation through the gas system. The lower or upstream collecting unit 23 is similar to that shown in U.S. Pat. No. 3,016,980 which is incorporated by reference in this specification. As discussed in that patent, the precipitator 23 includes an electrostatically charged ionizing or discharge zone 26 and a collecting zone 27 extending between a pair of spaced end plates of panels 25 which are supported by a frame 30 secured to the inner periphery of the housing in the precipitating section 8 in a fashion which accommodates installation and renewal of the precipitator through an access door 31 provided in the wall of the housing. Although the construction of the precipitator 23 is well known in the art and therefore is not described in detail in this specification, it should be noted the collecting zone 27 is comprised of interleaved sets of grounded plates 33 and electrically charged plates 32 secured in spaced parallel relation between the end panels 25 connected with electrical contacts 34 mounted on the end panel 25. Additionally, as shown in the drawings, a selected number of the grounded plates 33 extend into the ionizing zone 26. The portions of the grounded plates 33 which extend into the ionizing zone 26 serve as collector plates for that zone, cooperating with spaced discharge electrodes or ionizing wires 37 connected with an electrical contact 36 which is similarly mounted on the end panel 25.

Figure 5:
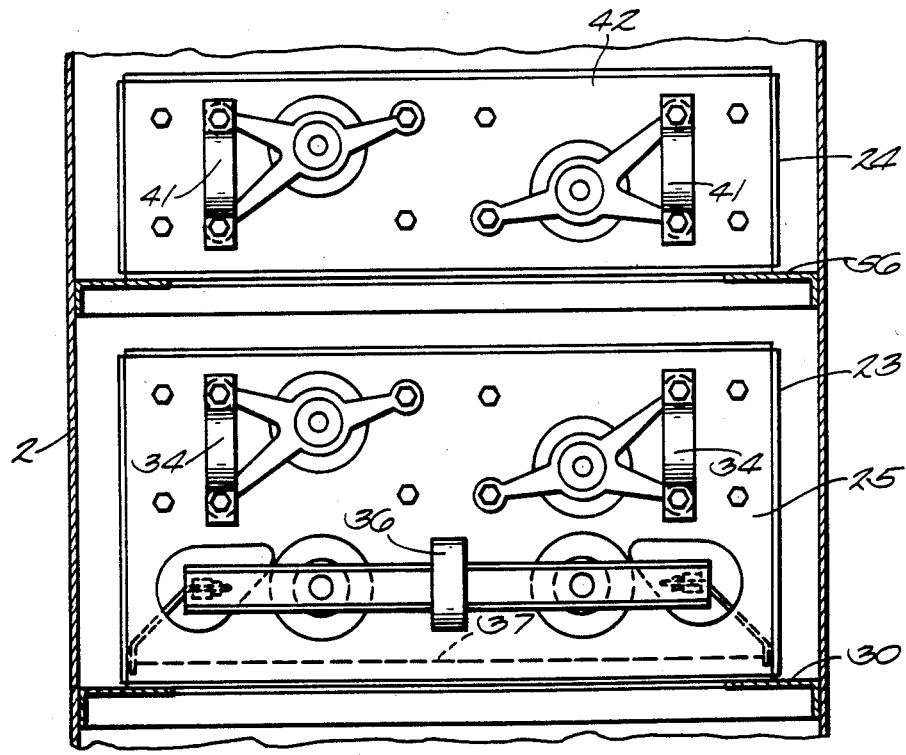
FIG. 5 is a partial cross-sectional view taken substantially along line V—V in FIG. 1.

The upper or downstream collecting unit 24 is in effect an extension of the collecting zone 27 of the lower or upstream unit 23. The collecting unit 24 is comprised of interleaved sets of grounded plates 44 and electrically charged plates 43 secured in spaced parallel relation between its end panels 42 which are adapted to be slid into the housing and secured in the precipitating section 8 on a supporting frame 56 mounted on the inner periphery of the housing. As shown in FIG. 5, the charged plates 43 are connected with electrical contacts 41.

During normal precipitating operations, a potential of about 14,000 volts is maintained between the ionizing wires or discharge electrodes 37 and the grounded collecting plates 33. This is maintained by a first DC power source 49 connected to the discharge electrodes through an electrical contact 50 which engages the contact 36 when the unit 23 is mounted in the housing. At the same time, a potential of about 6,800 volts is maintained between the charged and grounded plates in the collecting zones of both the units 23 and 24 by a second DC power source 52 connected to the electrical contacts 53 and 54 which similarly mate with the contacts 34 and 41 when the units are mounted within the housing.

The embodiments of the invention in which an exclusive property or privilege is claimed are defined as follows:

1. A self-cleaning collecting device in a recirculating gas system for removing noxious vapors and particulates from a dirty gas stream comprising:

A flow-through housing having a base and a top with a dirty gas inlet at the base of the housing, a clean gas outlet at the top of the housing, and a gas treating passage extending upwardly through the housing between the gas inlet and the gas outlet for conducting the gas stream through the housing, at least one access door on said housing for servicing filters and collecting units;

a liquid bath treating section including, an apertured plate having an upper surface secured in flow-through relation across the passage;

a reservoir receiving gas treating liquid aligned within the housing beneath the apertured plate;

pump means aspirating a predetermined flow of treating liquid from the reservoir and dispersing it on the upper surface of the apertured plate so as to migrate to the apertures in the plate to effect entrainment of the noxious vapors and larger particulates in a mist of liquid droplets formed in the gas stream as it passes through the plate;

a self-cleaning separating section including, a filter panel support defining a drain trough on one side of said housing;

a planar filter panel carried on said filter panel support and formed of a fiberous material secured in flow-through relation diagonally across the passage for convenient replacement above the apertured plate separating the entrained particulates and the liquid from the gas stream as it flows through the panel and draining accumulated liquid carrying particulates to the lower edge of the filter panel;

liquid return means including said drain trough and a drain passage circulating liquid accumulating from the filter panel back to the reservoir to maintain a flow of liquid within the panel which acts to wash the particulates from the panel; and at least one electrostatic collecting unit including a plurality of spaced parallel collecting electrode plates secured in flow-through relation across the passage between the filter panel and the gas outlet separating the smaller particulates from the gas stream and thereby clean the gas stream for recirculation in the gas system.

2. The collecting device of claim 1, and blower means secured in the housing between the collecting unit and the gas outlet adapted to draw the gas stream through the passage.

3. The collecting device of claim 1, and said filter panel being removably aligned within the housing at an acute angle to the horizontal so the liquid collected by the filter panel tends to accumulate along the lowermost edge of the filter panel; and said liquid return means including a trough aligned beneath the lowermost edge to collect the liquid as it drains from the filter panel.

4. The collecting device of claim 1, and said pump means comprising a pneumatic lift including a cup secured in the reservoir to provide a liquid sump, valve means accommodating a predetermined flow of liquid from the reservoir into the sump, and a tube extending from the sump through the apertured plate, whereby liquid is drawn into the sump and aspirated upwardly through the tube by the pressure differential across the perforated plate during gas cleaning operations.

5. The collecting device of claim 1, and door means in the housing accommodating installation and removal of the electrostatic collecting unit from a side of the housing.

6. The collecting device of claim 1, and door means in housing providing access to the interior of the reservoir accommodating the periodic removal of sludge accumulating in the reservoir as a result of the particulates in the treating liquid settling to the bottom of the reservoir during operation of the device.

7. The collection device of claim 1, and a plurality of said electrostatic collecting units secured in series within the passage above said filter panel.

8. The collecting device of claim 7, and the lowermost of said collecting units having a discharge zone and a collecting zone, at least some of said collecting plates including portions extending into both zones, a plurality of spaced discharge plates in the collecting zone alternately arranged with those portions of the collecting plates extending into the collecting zone, and spaced discharge electrode members alternately disposed in the discharge zone with those portions of the collecting plates extending into the discharge zone.

* * * * *